US009817167B2

(12) United States Patent
Shin et al.

(10) Patent No.: US 9,817,167 B2
(45) Date of Patent: Nov. 14, 2017

(54) PROTECTIVE FILM FOR POLARIZING PLATE, POLARIZING PLATE INCLUDING THE SAME, AND LIQUID CRYSTAL DISPLAY INCLUDING THE SAME

(71) Applicant: CHEIL INDUSTRIES INC., Gumi-si, Gyeongsangbuk-do (KR)

(72) Inventors: Kwang Ho Shin, Uiwang-si (KR); Eun Su Park, Uiwang-si (KR); Dong Yoon Shin, Uiwang-si (KR); Hae Ryong Chung, Uiwang-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 0 days.

(21) Appl. No.: 14/226,217

(22) Filed: Mar. 26, 2014

(65) Prior Publication Data

US 2014/0293197 A1 Oct. 2, 2014

(30) Foreign Application Priority Data

Mar. 29, 2013 (KR) .................. 10-2013-0034796

(51) Int. Cl.
*G02F 1/1335* (2006.01)
*G02B 5/30* (2006.01)
*G02B 1/14* (2015.01)

(52) U.S. Cl.
CPC ............. *G02B 5/3083* (2013.01); *G02B 1/14* (2015.01); *Y10T 428/24942* (2015.01)

(58) Field of Classification Search
CPC ........... G02F 1/133528; G02F 1/13362; G02F 1/133536; G02B 5/30; G02B 5/3083; G02B 1/14; Y10T 428/24942

(Continued)

(56) References Cited

U.S. PATENT DOCUMENTS 4,592,623 A 6/1986 Yamamoto et al.
2006/0182900 A1 8/2006 Kim et al.
(Continued)

FOREIGN PATENT DOCUMENTS

CN 101799564 A 8/2010
JP 2007-522533 A 8/2007
(Continued)

OTHER PUBLICATIONS

Taiwanese Patent Office action dated Mar. 27, 2015 in corresponding application No. TW 103111758, with English translation, 7 pages.

(Continued)

*Primary Examiner* — Nathanael R Briggs
*Assistant Examiner* — William Peterson
(74) *Attorney, Agent, or Firm* — Lewis Roca Rothgerber Christie LLP

(57) ABSTRACT

A protective film for a polarizing plate includes a base film and a primer layer on one or both sides of the base film. The protective film has a transmittance of about 90% or greater at a wavelength of 550 nm, and a ratio of the refractive index (B) of the primer layer to the refractive index (A) of the base film of about 0.6 to about 1.0. The protective film exhibits good adhesiveness to the polarizer and improves the transmittance of the polarizing plate. A polarizing plate including the same, and a liquid crystal display including the same are also disclosed.

9 Claims, 2 Drawing Sheets

(58) Field of Classification Search
USPC .......................................................... 349/96
See application file for complete search history.

(56) References Cited

U.S. PATENT DOCUMENTS

| | | | |
|---|---|---|---|
| 2009/0033833 A1* | 2/2009 | Aminaka ........................ | 349/68 |
| 2009/0213313 A1* | 8/2009 | Iwamoto ........... | G02F 1/133634 |
| | | | 349/118 |
| 2010/0220266 A1 | 9/2010 | Kashima et al. | |
| 2012/0224126 A1 | 9/2012 | Chang et al. | |
| 2012/0327350 A1* | 12/2012 | Chang ............... | G02F 1/133371 |
| | | | 349/139 |
| 2013/0194211 A1* | 8/2013 | Shinohara et al. .......... | 345/173 |
| 2014/0104519 A1* | 4/2014 | Murata ................ | G02B 5/3033 |
| | | | 349/15 |

FOREIGN PATENT DOCUMENTS

| | | |
|---|---|---|
| KR | 10-2011-0074307 A | 6/2011 |
| KR | 10-2013-0011353 A | 1/2013 |
| TW | 200714648 | 4/2007 |
| TW | 200722870 | 6/2007 |
| TW | 201221632 | 6/2012 |

OTHER PUBLICATIONS

KIPO Office action dated Aug. 26, 2013 in application No. 10-2013-0034796 (4 pages).
SIPO Office action dated Dec. 1, 2015, issued in CN application No. 201410123014.2, 9 pages.

* cited by examiner

PROTECTIVE FILM FOR POLARIZING PLATE, POLARIZING PLATE INCLUDING THE SAME, AND LIQUID CRYSTAL DISPLAY INCLUDING THE SAME

CROSS-REFERENCE TO RELATED APPLICATION

This application claims priority to and the benefit of Korean Patent Application No. 10-2013-0034796 filed in the Korean Intellectual Property Office on Mar. 29, 2013, the entire contents of which are incorporated herein by reference.

BACKGROUND

1. Field

The following description relates to a protective film for polarizing plates, a polarizing plate including the same, and a liquid crystal display including the same.

2. Description of the Related Art

Polarizing plates can control an oscillation direction of light to allow the viewer to see the display patterns on a liquid crystal display of a liquid crystal cell. Although initially the liquid crystal display was primarily used in small apparatuses, a wider range of applications for the liquid crystal display is currently available, including notebook computers, liquid crystal monitors, liquid crystal color projectors, liquid crystal television sets, navigation systems for vehicles, personal cellular phones, and measuring instruments used indoors and outdoors.

The polarizing plate for the liquid crystal display usually includes a polarizer and protective films on both sides of the polarizer. The protective films can protect the polarizer. In addition, stretching the protective film can realize an appropriate retardation value and thus can compensate for the viewing angle.

A polyethylene terephthalate (PET) film, which can be used in protective films for polarizing plates, has a non-polar surface and therefore requires a double-sided adhesive primer layer to bond to the polarizer. However, high adhesion to the polarizer deteriorates transmittance of the PET film. On the other hand, increasing the transmittance of the PET film causes deterioration in adhesion to the polarizer.

SUMMARY

In accordance with one or more aspects of embodiments of the present invention, a protective film for a polarizing plate includes a base film and a primer layer on one or both sides of the base film. The protective film has a transmittance of about 90% or greater at a wavelength of 550 nm, and a ratio (B/A) of the refractive index (B) of the primer layer to the refractive index (A) of the base film of about 0.6 to about 1.0.

In accordance with another aspect of embodiments of the present invention, a polarizing plate includes a polarizer and the protective film on one side (e.g. an upper side) of the polarizer.

In accordance with another aspect of embodiments of the present invention, a liquid crystal display includes the polarizing plate.

DETAILED DESCRIPTION

Figure 1:
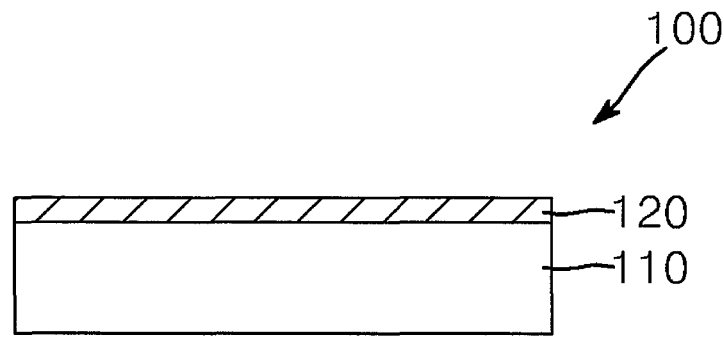
FIG. 1 is a cross-sectional view of a protective film for a polarizing plate according to one embodiment of the present invention.

Embodiments of the present invention will be described with reference to the accompanying drawings. It should be understood that the present invention may be embodied in different ways and is not limited to the following embodiments. In the drawings, portions not necessary for understanding the invention are omitted for clarity. Like components will be denoted by like reference numerals throughout the specification. As used herein, directional terms such as "upper side" and "lower side" are defined with reference to the accompanying drawings. Thus, it will be understood that the term "upper side" can be used interchangeably with the term "lower side". It will be understood that when a layer is referred to as being "on" another layer, the layer can be directly on the other layer, or an intervening layer(s) may also be present. On the other hand, when a layer is referred to as being "directly on" another layer, an intervening layer(s) is not present. Expressions such as "at least one of" and "one of," when preceding a list of elements, modify the entire list of elements and do not modify the individual elements of the list. Further, the use of "may" when describing embodiments of the present invention refers to "one or more embodiments of the present invention."

In accordance with aspects of embodiments of the present invention, a protective film for a polarizing plate may include a base film and a primer layer on one or both sides of the base film. The protective film may have a transmittance of about 90% or greater at a wavelength of 550 nm, and a ratio (B/A) of the refractive index (B) of the primer layer to the refractive index (A) of the base film may be about 0.6 to about 1.0. Within these ranges, the protective film can exhibit relatively high adhesion to a polarizer and a relatively high transmittance, and can improve the transmittance of the polarizing plate stacked on the polarizer and eliminate the need for the polarizer to have a high transmittance, thus improving the degree of polarization of the polarizer.

Figure 2:
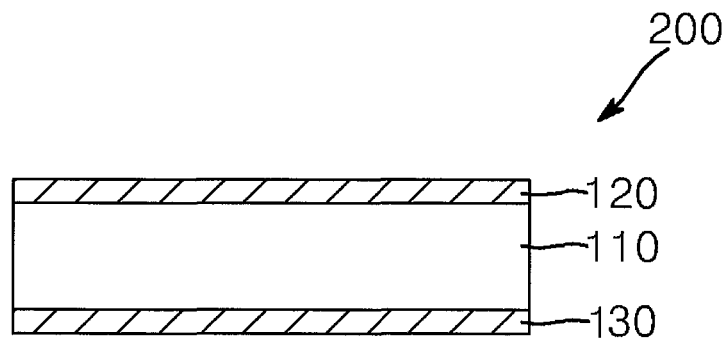
FIG. 2 is a cross-sectional view of a protective film for a polarizing plate according to another embodiment of the present invention.

Hereinafter, the protective film for a polarizing plate according to embodiments of the present invention will be described with reference to FIGS. 1 and 2. FIGS. 1 and 2 are each a cross-sectional view of a protective film for a polarizing plate according to embodiments of the present invention.

Referring to FIG. 1, a protective film 100 for a polarizing plate may include a base film 110 and a first primer layer 120 on one side (e.g. an upper side) of the base film 110. The base film 110 and the first primer layer 120 may contact each other.

Referring to FIG. 2, a protective film 200 for a polarizing plate may include a base film 110, a first primer layer 120 on a first side (e.g. an upper side) of the base film 110, and a second primer layer 130 on a second side (e.g. a lower side) of the base film 110. The base film 110 and the first primer layer 120 may contact each other, and the base film 110 and the second primer layer 130 may contact each other.

Hereinafter, the "primer layer" refers to the first primer layer and/or the second primer layer.

The protective film for a polarizing plate may have a transmittance of about 90% or greater at a wavelength of 550 nm. In embodiments where the protective film has a transmittance of about 90% or greater, the protective film can improve the transmittance of a polarizing plate stacked on the polarizer and eliminate the need for the polarizer to have a high transmittance, thus further improving the degree of polarization of the polarizer. In one embodiment, the protective film has a transmittance of about 90% to about 99% at a wavelength of 550 nm.

In some embodiments, the protective film has a ratio (B/A) of the refractive index (B) of the primer layer to the refractive index (A) of the base film of about 0.6 to about 1.0, and in some embodiments about 0.69 to about 0.95, about 0.7 to about 0.9, or about 0.72 to about 0.88. For example, the protective film may have a ratio (B/A) of about 0.72, 0.73, 0.74, 0.75, 0.76, 0.77, 0.78, 0.79, 0.80, 0.81, 0.82, 0.83, 0.84, 0.85, 0.86, 0.87 or 0.88. Within these ranges, the protective film can have a transmittance of 90% or greater, and can improve the transmittance of the polarizing plate stacked on the polarizer and eliminate the need for the polarizer to have a high transmittance, thus further improving the degree of polarization of the polarizer. The refractive index of the base film or the primer layer may be measured at a wavelength of 550 nm using, for example, an Abbe refractometer.

In embodiments where the protective film is on the polarizer, the primer layer is a double-sided adhesive layer between the base film and the polarizer. In one embodiment, the primer layer contacts both the base film and the polarizer and improves adhesion between the base film and the polarizer, thus improving the bonding of the base film to the polarizer. For example, while a polyester base film does not bond to the polarizer well (or adequately) by itself, the primer layer modifies the surface of the base film and thus can improve the bonding of the polyester base film to the polarizer.

In some embodiments, the primer layer has a thickness of about 1 nm to about 200 nm, and in some embodiments of about 60 nm to about 200 nm. Within these ranges, the primer layer can be applied to the polarizing plate, can improve transmittance of the protective film by providing an appropriate (or suitable) refractive index as compared to that of the base film, can improve the bonding of the polarizer to the base film, and does not suffer from brittleness.

In one embodiment, the primer layer may have a lower refractive index or the same refractive index as that of the base film. In some embodiments, the primer layer has a refractive index of about 1.0 to about 1.6, and in some embodiments about 1.1 to about 1.6, or about 1.1 to about 1.5. For example, the primer payer may have a refractive index of about 1.0, 1.1, 1.2, 1.3, 1.4, 1.5 or 1.6. Within these ranges, the primer layer can be applied to the polarizing plate and can provide an appropriate (or suitable) refractive index as compared to that of the base film, thus improving the transmittance of the protective film. The refractive index for the primer layer may be measured at a wavelength of 550 nm using, for example, an Abbe refractometer.

The primer layer may be formed of any suitable material, without limitation, so long as the material can realize the thickness and the refractive index described above. In one embodiment, the primer layer may be a non-urethane primer layer, i.e. a primer without a urethane group. In one embodiment, the primer layer may be formed of a material selected from a resin or a monomer, such as polyester, acryl, or the like, but the material for forming the primer layer is not limited thereto. In one embodiment, the above-described refractive index of the primer layer can be realized by controlling a mixing ratio (for example, a molar ratio) of polyester to acryl. The primer layer may further include additives, in addition to the resin or monomer described above. In one embodiment, the additives may include crosslinking curing agents, surfactants, anti-foaming agents, antistatic agents, inorganic particles, and the like, without being limited thereto.

In embodiments where the primer layer is formed of the resin or monomer, such as polyester, acryl, or the like, the primer layer can improve adhesion of the base film under high temperature and high humidity conditions, and thus can facilitate adequate (or satisfactory) bonding of the protective film to the polarizer.

In one embodiment, the primer layer improves transmittance of the protective film and the polarizing plate including the protective film, and thus, eliminates the need to further improve the transmittance of the polarizer, thereby further improving the degree of polarization of the polarizer.

The base film may be a uniaxially stretched film. In one embodiment, the uniaxially stretched base film exhibits improved elastic modulus and toughness due to increased crystallinity, and provides for improved surface hardness.

The base film may be transparent, and may include, without limitation, a polyester, an acrylic or an olefin film. In one embodiment, the base film may include a polyethylene terephthalate (PET) film, a polyethylene naphthalate film, or the like, without being limited thereto.

In some embodiments, the base film has a thickness of about 25 μm to about 500 μm, and in some embodiments about 25 μm to about 200 μm. Within these ranges, the base film can be applied to the protective film for a polarizing plate.

In some embodiments, the base film has a refractive index of about 1.3 to about 1.7, and in some embodiments about 1.4 to about 1.6. For example, the base film may have a refractive index of about 1.3, 1.4, 1.5, 1.6 or 1.7. Within these ranges, the base film can be applied to the protective film for a polarizing plate, and the refractive index of the base film can be easily controlled with respect to the refractive index of the primer layer, and thus the base film can exhibit improved transmittance. The refractive index of the base film may be measured at a wavelength of 550 nm using, for example, an Abbe refractometer.

The base film may be an ultrahigh performance retardation film. Accordingly, when the base film is applied to the protective film of the polarizing plate, the protective film does not suffer from rainbow spots and lateral light leakage, can minimize the change in phase difference depending on the angle of incidence of light, and can minimize the change in phase difference depending on wavelengths.

In some embodiments, the base film has an in-plane retardation (Re) at a wavelength of 550 nm of about 10,000 nm or more, and in some embodiments about 10,100 nm to about 50,000 nm, or about 10,100 nm to about 15,500 nm. Within these ranges, when the base film is applied to the protective film, the protective film does not suffer from rainbow spots and lateral light leakage, can minimize the change in phase difference depending on the angle of incidence of light, and can minimize the change in phase difference depending on wavelength.

The in-plane retardation (Re) of the base film may be calculated using Equation 1:

$$Re = (nx - ny) \times d \qquad \text{Equation 1}$$

In Equation 1, nx and ny are the refractive indices in the x- and y-axis directions, respectively, at a wavelength of 550 nm, and d is a thickness of the base film in nm.

In one embodiment, the base film may have a value of (nx−ny) of about 0.1 to about 0.2. For example, the base film may have the value of (nx−ny) of about 0.1, 0.11, 0.12, 0.13, 0.14, 0.15, 0.16, 0.17, 0.18, 0.19 or 0.2 at a wavelength of 550 nm. Within this range, when the base film is applied to the protective film, the protective film does not suffer from rainbow spots, since the change in phase difference depending on wavelength and on the angle of incidence of light is small.

In some embodiments, the base film has an out-of-plane retardation (Rth) at a wavelength of 550 nm of about 15,000 nm or less, and in some embodiments about 10,000 nm to about 12,000 nm. For example, the base film may have an out-of-plane retardation (Rth) of about 10,000, 10,500, 11,000, 11,500 or 12,000 nm, as calculated using Equation 2:

$$Rth = ((nx+ny)/2 - nz) \times d \qquad \text{Equation 2}$$

In Equation 2, nx, ny and nz are the refractive indices in the x-, y- and z-axis directions, respectively, at a wavelength of 550 nm, and d is the thickness of the base film in nm.

In some embodiments, the base film has a degree of biaxiality (NZ) at a wavelength of 550 nm of about 1.8 or less, and in some embodiments about 1.5 to about 1.7. For example, the base film may have a degree of biaxiality of about 1.5, 1.6 or 1.7, as calculated using Equation 3:

$$NZ = (nx-nz)/(nx-ny) \qquad \text{Equation 3}$$

In Equation 3, nx, ny and nz are the refractive indices in the x-, y- and z-axis directions, respectively, at a wavelength of 550 nm. In embodiments where the base film has a degree of biaxiality within the aforementioned ranges, when the base film is applied to the protective film, the protective film does not suffer from rainbow spots and lateral light leakage, can minimize the change in phase difference depending on the angle of incidence of light, and can minimize the change in phase difference depending on wavelength.

In some embodiments, the base film has a ratio of out-of-plane retardation to in-plane retardation (Rth/Re) at a wavelength of 550 nm of about 1.3 or less, and in some embodiments about 1.0 to about 1.2. For example, the base film may have a ratio of out-of-plane retardation to in-plane retardation of about 1.0, 1.05, 1.1, 1.15 or 1.2.

The base film may be a retardation film, and may have a width in the x-axis direction corresponding to a width direction of the base film (TD, transverse direction), a length in the y-axis direction corresponding to a length direction of the base film (MD, machine direction), and a thickness in the z-axis direction corresponding to a thickness direction of the base film.

Referring to FIG. 2, the refractive indices, thicknesses, materials, and the like of the first and second primer layers 120 and 130 may be the same or different. In one embodiment, the first primer layer may have a refractive index of about 1.1 to about 1.6, and the second primer layer may have a refractive index of about 1.1 to about 1.6, at a wavelength of 550 nm, but the refractive indices of the first and second primer layers are not limited thereto. In embodiments where the first and second primer layers have the same or different refractive indices, thicknesses and the like, the protective film for a polarizing plate can be stacked on the polarizer and a functional layer or the like can be further stacked on the protective film, and the resulting polarizing plate may exhibit improved transmittance. The functional layer may include a hard coating layer, an anti-glare layer, an anti-static layer or the like, without being limited thereto.

In some embodiments, the protective film has a thickness of about 25 μm to about 500 μm, and in some embodiments about 25 μm to about 200 μm, or about 25 μm to about 115 μm. Within these ranges, the protective film can be applied to the polarizing plate.

The protective film may be prepared by any suitable method, according to which a primer layer is formed on a base film. In one embodiment, the protective film may be prepared by coating a composition for forming a primer layer on one or both sides of the base film, followed by drying and curing.

Figure 3:
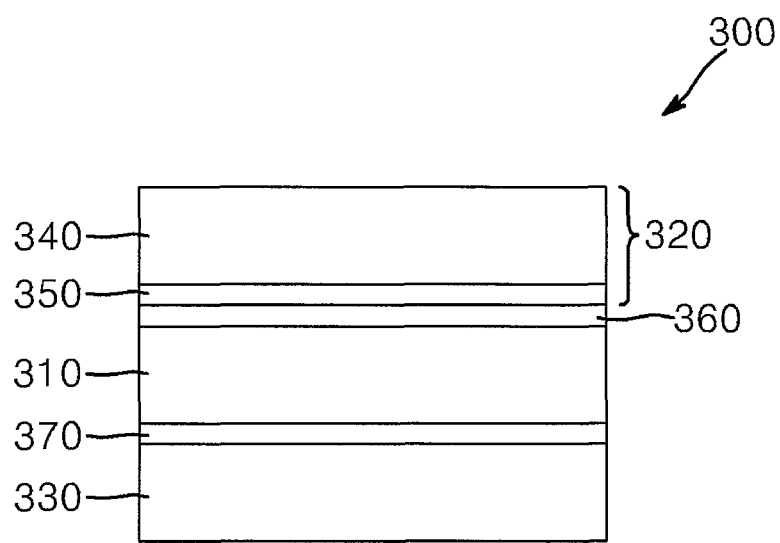
FIG. 3 is a cross-sectional view of a polarizing plate according to one embodiment of the present invention.
Figure 4:
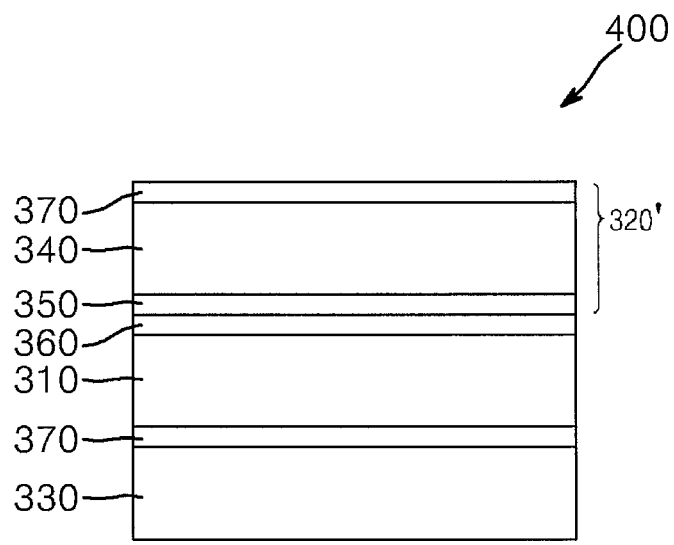
FIG. 4 is a cross-sectional view of a polarizing plate according to another embodiment of the present invention.

In accordance with another aspect of embodiments of the present invention, a polarizing plate may include a polarizer and a protective film on one surface of the polarizer. Hereinafter, polarizing plates according to embodiments of the present invention will be described with reference to FIGS. 3 and 4. FIGS. 3 and 4 are each a cross-sectional view of a polarizing plate according to embodiments of the present invention.

Referring to FIG. 3, a polarizing plate 300 may include: a polarizer 310; a protective film 320 for a polarizing plate on a first side (e.g. an upper side) of the polarizer 310 and including a base film 340 and a first primer layer 350 on one side (e.g. a lower side) of the base film 340; an optical compensation film 330 on a second side (e.g. a lower side) of the polarizer 310; a first bonding layer 360 between the first primer layer 350 and the polarizer 310; and a second bonding layer 370 between the polarizer 310 and the optical compensation film 330. The protective film 320 may be the protective film for a polarizing plate as described above.

Referring to FIG. 4, a polarizing plate 400 may include: a polarizer 310; a protective film 320' for a polarizing plate on a first side (e.g. an upper side) of the polarizer 310, and including a base film 340, a first primer layer 350 on a first side (e.g. a lower side) of the base film 340 and a second primer layer 370 on a second side (e.g. an upper side) of the base film 340; an optical compensation film 330 on a second side (e.g. a lower side) of the polarizer 310; a first bonding layer 360 between the first primer layer 350 and the polarizer 310; and a second bonding layer 370 between the polarizer 310 and the optical compensation film 330. The protective film 320' for a polarizing plate may be the protective film for a polarizing plate as described above.

The polarizer may be any suitable polarizer, without limitation, so long as the polarizer can be used for polarizing plates. In one embodiment, the polarizer is prepared by dyeing a polyvinyl alcohol film with a dichroic material, followed by stretching the film in a certain direction. In one embodiment, the polarizer is prepared by swelling, dyeing, stretching and cross-linking processes. A method of performing each process should be apparent to those of ordinary skill in the art.

The polarizer may have a thickness of about 2 μm to about 30 μm, but is not limited thereto.

The optical compensation film may be, for example, a retardation compensation film capable of adjusting the optical properties of light passing through a liquid crystal display panel and thus capable of adjusting the phase difference or improving the viewing angle, but the optical compensation film is not limited thereto.

The retardation compensation film may be any suitable film, without limitation, so long as the film can be used for polarizing plates and is capable of providing retardation compensation. The retardation compensation film may be a film formed of a material selected from acrylics, cellulose, olefin compounds, or mixtures thereof. In one embodiment, the retardation compensation film is a cellulose film, and in one embodiment, the retardation compensation film is a triacetyl cellulose (TAC) film.

In some embodiments, the retardation compensation film may have a thickness of about 10 µm to about 100 µm, and in some embodiments about 40 µm to about 80 µm. Within these ranges, the retardation compensation film, when used for the polarizing plate, exhibits good (or adequate) polarization for liquid crystals, can provide optical compensation, and can prevent or reduce discoloration and rainbow spots.

The protective film may be stacked (or positioned) on the first side (e.g. the upper side) of the polarizer 310 via the first bonding layer 360, and the optical compensation film 330 may be stacked (or positioned) on the second side (e.g. the lower side) of the polarizer 310 via the second bonding layer 370. The first and second bonding layers 360 and 370 may include at least one bonding agent for polarizing plates selected from a water-based bonding agent, a UV curable bonding agent or a pressure-sensitive bonding agent, but the first and second bonding layers 360 and 370 are not limited thereto.

The functional layer may be formed on one surface of the protective film. As described above, the functional layer may include a hard coating layer, an anti-glare layer, an anti-static layer, or the like, but the functional layer is not limited thereto.

Although not shown in FIGS. 3 and 4, the polarizing plate may include an adhesive layer on one side (e.g. a lower side) of the optical compensation film 330. The polarizing plate may be stacked (or positioned) on a liquid crystal panel via the adhesive layer. The adhesive layer may include any suitable adhesive for polarizing plates, without limitation. For example, the adhesive layer may include a (meth)acrylic adhesive.

In a liquid crystal display, the polarizing plate may be included as an upper or lower polarizing plate. Generally, the liquid crystal display includes a liquid crystal display panel, a backlight unit, and a polarizing plate. As used herein, the "upper polarizing plate" refers to a polarizing plate on a front side of the liquid crystal display panel, and the "lower polarizing plate" refers to a polarizing plate on a back side of the liquid crystal display panel between the liquid crystal display panel and the backlight unit.

In accordance with an aspect of embodiments of the present invention, a liquid crystal display may include the polarizing plate described above. In one embodiment, the liquid crystal display may include: a liquid crystal display panel; a first polarizing plate on a first side (e.g. an upper side) of the liquid crystal display panel; and a second polarizing plate on a second side (e.g. a lower side) of the liquid crystal display panel. At least one of the first and second polarizing plates may be the polarizing plate as described above.

Figure 5:
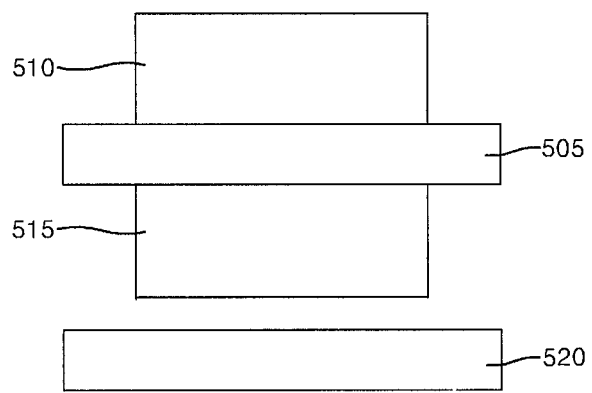
FIG. 5 is a cross-sectional view of a liquid crystal display according to one embodiment of the present invention.

FIG. 5 is a cross-sectional view of a liquid crystal display according to one embodiment of the present invention.

Referring to FIG. 5, a liquid crystal display may include: a liquid crystal display panel 505; a first polarizing plate 510 on a first side (e.g. an upper side) of the liquid crystal display panel 505; and a second polarizing plate 515 on a second side (e.g. a lower side) of the liquid crystal display panel and between the liquid crystal display panel 505 and a backlight unit 520. At least one of the first and second polarizing plates 510 and 515 may be the polarizing plate described above.

Although not shown in FIG. 5, the first and second polarizing plates 510 and 515 may be respectively formed on the liquid crystal display panel 505 via bonding layers.

Hereinafter, embodiments of the present invention will be described with reference to some examples. However, it should be noted that these examples are provided for illustration only and are not to be construed in any way as limiting the present invention.

EXAMPLES 1 TO 2 AND 6 AND COMPARATIVE EXAMPLE 2

Primer layers (TOYOBO Co., Ltd, Japan) each having a refractive index (measured at a wavelength of 550 nm using an Abbe refractometer) and a thickness (measured using a micrometer) as listed in Table 1, were coated onto one surface of a polyethylene terephthalate film (TOYOBO CO., Ltd., Japan, thickness: 100 µm, Re: 10,500 nm, Rth: 12,000 nm, NZ: 1.62, and refractive index: 1.59, at a wavelength of 550 nm), used as a base film, thereby preparing a protective film for a polarizing plate.

A polyvinyl alcohol film was stretched to 3 times its initial length at 60° C., followed by iodine adsorption onto the polyvinyl alcohol film, and then stretched to 2.5 times the length of the resulting stretched film in a boric acid solution at 40° C., thereby preparing a polarizer. The protective film was bonded to the polarizer using a bonding agent (Z-200, Nippon Gohsei Co., Ltd.) such that the primer layer contacted an upper side of the polarizer, and an optical compensation film (N-TAC (triacetyl cellulose retardation film), KONICA MINORTA, thickness: 40 µm) was bonded to a lower side of the polarizer using the bonding agent (Z-200, Nippon Gohsei Co., Ltd.), thereby preparing a polarizing plate.

EXAMPLES 3 TO 5 AND 7 AND COMPARATIVE EXAMPLES 3 TO 4

Primer layers (TOYOBO Co., Ltd, Japan) each having a refractive index (measured at a wavelength of 550 nm using an Abbe refractometer) and a thickness (measured using a micrometer) as listed in Table 1 were coated onto both upper and lower sides of a polyethylene terephthalate film (TOYOBO CO., Ltd., Japan, thickness: 100 µm, Re: 10,500 nm, Rth: 12,000 nm, NZ: 1.62, and refractive index: 1.59, at a wavelength of 550 nm), used as a base film, thereby preparing a protective film for a polarizing plate. A polyvinyl alcohol film was stretched to 3 times its initial length at 60° C., followed by iodine adsorption onto the polyvinyl alcohol film, and then stretched to 2.5 times the length of the resulting stretched film in a boric acid solution at 40° C., thereby preparing a polarizer. The protective film was bonded to the polarizer using a bonding agent (Z-200, Nippon Gohsei Co., Ltd.) such that the primer layer contacted an upper side of the polarizer, and an optical compensation film (N-TAC (triacetyl cellulose retardation film), KONICA MINORTA, thickness: 40 µm) was bonded to a lower side of the polarizer using the bonding agent (Z-200, Nippon Gohsei Co., Ltd.), thereby preparing a polarizing plate.

COMPARATIVE EXAMPLE 1

A polarizing plate was prepared as in Example 1 except that a protective film for a polarizing plate without a primer layer was used.

Transmittance was measured for each of the protective films and the polarizing plates described above at a wavelength of 550 nm using a UV-VIS spectrophotometer (V-7100, Jasco Co., Ltd.). Results are shown in Table 1.

TABLE 1

| | Constitution of protective film for polarizing plates | | | | | | | Transmittance (%) | |
|---|---|---|---|---|---|---|---|---|---|
| | | | Refractive index of primer layer | | Thickness of primer layer (nm) | | Ratio of refractive index of primer layer | | |
| | One surface coating | Both surfaces coating | Upper primer layer | Lower primer layer | Upper primer layer | Lower primer layer | to refractive index of base film | Protective film for polarizing plates | Polarizing plate |
| Example 1 | ○ | — | 1.5 | — | 120 | — | 0.943 | 90.84 | 40.1 |
| Example 2 | ○ | — | 1.3 | — | 120 | — | 0.818 | 92.2 | 42.8 |
| Example 3 | — | ○ | 1.5 | 1.5 | 60 | 60 | 0.943 | 91.99 | 41.5 |
| Example 4 | — | ○ | 1.5 | 1.5 | 120 | 120 | 0.943 | 93.45 | 42.8 |
| Example 5 | — | ○ | 1.3 | 1.3 | 120 | 120 | 0.818 | 94.60 | 43.8 |
| Example 6 | ○ | — | 1.1 | — | 60 | — | 0.691 | 92.89 | 42.9 |
| Example 7 | — | ○ | 1.1 | 1.1 | 60 | 60 | 0.691 | 91.28 | 40.8 |
| Comparative Example 1 | — | — | — | — | — | — | — | 89.70 | Not measurable due to failure to bond |
| Comparative Example 2 | ○ | — | 2.0 | — | 120 | — | 1.258 | 83.14 | 35.2 |
| Comparative Example 3 | — | ○ | 2.0 | 2.0 | 60 | 60 | 1.258 | 84.20 | 36.0 |
| Comparative Example 4 | — | ○ | 2.0 | 2.0 | 120 | 120 | 1.258 | 88.54 | 40.2 |

As shown in Table 1, the protective films according to embodiments of the present invention (illustrated in Examples 1-7) had high transmittance, and thus could improve transmittance of the polarizing plate. The protective films according to Examples 1-7 also had high adhesiveness to the polarizer. In contrast, the protective films according to Comparative Examples 1-4, which either did not include a primer layer or included the base films and the primer layers having refractive indices outside of the ranges of the refractive indices according to embodiments the present invention, had low transmittance, and thus could not improve the transmittance of the polarizing plate and the adhesiveness of the protective film to the polarizer to the same extent as the protective films of Examples 1-7.

It should be understood that various modifications, changes, alterations, and equivalent embodiments can be made by those of ordinary skill in the art without departing from the spirit and scope of the invention.

What is claimed is:

1. A protective film for a polarizing plate, the protective film comprising:
   a base film having an out-of-plane retardation (Rth) at a wavelength of 550 nm of about 4,000 nm to about 15,000 nm as calculated using Equation 2:

$$Rth = ((nx+ny)/2 - nz) \times d \qquad \text{Equation 2}$$

wherein Rth is the out-of-plane retardation, nx, ny and nz are refractive indices in x-, y- and z-axis directions, respectively, at a wavelength of 550 nm, and d is a thickness of the base film in nm; and
   a primer layer on one or both sides of the base film,
   wherein the base film has a refractive index of about 1.3 to about 1.7, and the primer layer has a refractive index of about 1.0 to about 1.6, and
   wherein the protective film has a transmittance of about 90% or greater at a wavelength of 550 nm, and a ratio of a refractive index of the primer layer to a refractive index of the base film of about 0.6 to about 1.0,
   wherein the base film has a degree of biaxiality (NZ) at a wavelength of 550 nm of about 1.5 to about 1.7, as calculated using Equation 3:

$$NZ = (nx-nz)/(nx-ny) \qquad \text{Equation 3}$$

wherein NZ is the degree of biaxiality, nx, ny and nz are refractive indices in x-, y- and z-axis directions, respectively, at a wavelength of 550 nm.

2. The protective film according to claim 1, wherein the primer layer has a thickness of about 1 nm to about 200 nm.

3. The protective film according to claim 1, wherein the primer layer comprises a polyester, an acrylic resin, or a combination thereof.

4. The protective film according to claim 1, wherein the base film has an in-plane retardation (Re) at a wavelength of 550 nm of about 10,000 nm or more, as calculated using Equation 1:

$$Re = (nx-ny) \times d \qquad \text{Equation 1}$$

wherein Re is an in-plane retardation, nx and ny are refractive indices in x- and y-axis directions, respectively, at a wavelength of 550 nm, and d is a thickness of the base film in nm.

5. The protective film according to claim 1, wherein the base film has an in-plane retardation (Re) at a wavelength of 550 nm as calculated using Equation 1, and wherein a ratio of the out-of-plane retardation to the in-plane retardation is about 1.3 or less:

$$Re = (nx-ny) \times d \qquad \text{Equation 1}$$

wherein Re is an in-plane retardation, nx, ny and nz are refractive indices in x-, y- and z-axis directions, respectively, at a wavelength of 550 nm, and d is a thickness of the base film in nm.

6. The protective film according to claim 1, wherein the base film comprises a polyethylene terephthalate (PET) film.

7. A polarizing plate comprising:
   a polarizer; and
   the protective film according to claim 1 on a first side of the polarizer.

8. The polarizing plate according to claim 7, further comprising: an optical compensation film on a second side of the polarizer.

9. A liquid crystal display comprising the polarizing plate according to claim 8.

* * * * *

UNITED STATES PATENT AND TRADEMARK OFFICE
CERTIFICATE OF CORRECTION

PATENT NO.         : 9,817,167 B2
APPLICATION NO.    : 14/226217
DATED              : November 14, 2017
INVENTOR(S)        : Kwang Ho Shin et al.

Page 1 of 1

It is certified that error appears in the above-identified patent and that said Letters Patent is hereby corrected as shown below:

In the Claims
Column 11, Line 5, Claim 9    delete "claim 8." and insert -- claim 7. --

Signed and Sealed this
Eleventh Day of June, 2019

Andrei Iancu
*Director of the United States Patent and Trademark Office*